United States Patent [19]

Yerushalmi et al.

[11] Patent Number: 5,424,260
[45] Date of Patent: Jun. 13, 1995

[54] METHOD OF RECYCLING ALUMINUM DROSS

[75] Inventors: Daniel Yerushalmi, Cleveland; Leonard Sarko, Dublin, both of Ohio

[73] Assignee: Aluminum Waste Technology, Inc., Cleveland, Ohio

[21] Appl. No.: 192,247

[22] Filed: Feb. 7, 1994

[51] Int. Cl.$^6$ .............................................. C04B 35/10
[52] U.S. Cl. ................... 501/155; 501/118; 501/153; 501/154; 264/64
[58] Field of Search ............... 501/95, 118, 153, 154, 501/155; 264/64

[56] References Cited

U.S. PATENT DOCUMENTS

| | | |
|---|---|---|
| 4,543,107 | 9/1985 | Rue . |
| 5,009,511 | 4/1991 | Sarko et al. . |
| 5,035,723 | 7/1991 | Kalinowski et al. . |
| 5,095,665 | 3/1992 | Nagata et al. . |
| 5,100,581 | 3/1992 | Watanabe et al. . |
| 5,102,453 | 4/1992 | Yerushalmi . |
| 5,110,322 | 5/1992 | Narayanan et al. . |
| 5,114,438 | 5/1992 | Leatherman et al. . |
| 5,118,326 | 6/1992 | Lee et al. . |
| 5,131,923 | 7/1992 | Markhoff-Matheny et al. . |
| 5,132,246 | 7/1992 | Brisson et al. ...................... 501/155 |
| 5,152,810 | 10/1992 | Rue et al. . |
| 5,192,339 | 3/1993 | Hasegawa et al. . |
| 5,203,886 | 4/1993 | Sheldon et al. . |
| 5,215,552 | 6/1993 | Sung . |
| 5,227,143 | 7/1993 | Stewart, Jr. et al. . |
| 5,230,833 | 7/1993 | Romberger et al. . |

*Primary Examiner*—Mark L. Bell
*Assistant Examiner*—Michael Marcheschi
*Attorney, Agent, or Firm*—Andrew Alexander

[57] ABSTRACT

An improved method for processing aluminum dross containing fluxing salt to provide a fired inorganic or ceramic product wherein said dross is processed to remove fluxing salts therefrom, and wherein a non-metallic product is recovered. The improved process comprises providing a body of the non-metallic product in an aqueous slurry, a major portion of the body comprised of $Al_2O_3$ and minor portions of said body comprised of $SiO_2$ and $MgO$. The composition of the slurry is adjusted by adding one of $Al_2O_3$ and $SiO_2$ in an amount sufficient to form the fired inorganic product on heating. The slurry is heated to a temperature sufficiently high to fire the slurry and produce the fired inorganic product.

25 Claims, 2 Drawing Sheets

METHOD OF RECYCLING ALUMINUM DROSS

BACKGROUND OF THE INVENTION

This invention relates to aluminum dross and more particularly, it relates to the use of oxide products or non-metallic products (NMP) recovered from aluminum dross.

Aluminum dross results from the melting of aluminum scrap such as used beverage containers, aluminum siding, castings and the like and treating the melt with salt flux. The flux accumulates on top of the melt and forms a dross or skim which contains aluminum, oxides of aluminum and oxides of elements such as magnesium and silicon and other alloying elements present in the various alloys. The dross is removed or skimmed from the melt and processed usually to recover the metallic aluminum occluded in the oxides. The aluminum can constitute 5 to 70% of the dross. Usually, the aluminum, which is considered the most valuable component, is recovered from the solidified dross by first fracturing it, for example, by ball milling. Thereafter, the fractured dross is heated in the presence of additional salt flux to free the metallic aluminum. The molten salt flux aids in releasing the molten aluminum from the dross. The salt flux is usually comprised of sodium chloride and potassium chloride. After the metallic aluminum is removed, the dross is comprised of salt flux and an insoluble constituent comprised largely of aluminum oxide, silicon oxide and magnesium oxide, often referred to as salt cake. Also, included in the salt cake are minor amounts of oxides of titanium oxide, copper oxide, zinc oxide, sulfur oxide, potassium oxide and sodium oxide. The titanium, copper and zinc oxide can be present from alloying elements in the aluminum scrap. It is desirable to recover all useful constituents from the salt cake. Thus, to avoid leaching of soluble salts from salt cake in landfills, the salt cake is treated to recover the salts in the salt flux and recover it from the insoluble constituents or non-metallic product. The salt cake can be advantageously treated in accordance with the procedures set forth in U.S. Pat. Nos. 5,102,453 and 5,227,143. However, even after such treatment, there remains the insoluble constituent or non-metallic product. U.S. Pat. No. 5,102,453 discloses the problems attendant the presence of magnesium from magnesium-containing alloys and the problems resulting from the addition of magnesium chloride to the recovery system. Namely, such addition increases the overall amount of magnesium chloride contained in the unrecoverable material or non-metallic product and even when disposed of in plastic film-lined landfills, problems still result. Thus, often the process of leaching the salt cake is not optimized to avoid disposal problems with non-metallic product.

Thus, it will be seen that there is a great need for a process that enables the recovery of the non-metallic product thereby recovering all the constituents from the aluminum dross and avoiding any dumping of NMP in landfills. The present invention provides such a process.

SUMMARY OF THE INVENTION

It is an object of the present invention to provide an improved process for treating salt cake.

It is another object of the invention to provide an improved process for recovering salts and non-metallic product from salt cake.

Yet, it is another object of the present invention to recovery both the salts and the NMP from salt cake.

And yet, it is another object of the present invention to provide a process for treating salt cake to recover all the components therein.

In accordance with these objects, there is provided an improved method for processing aluminum dross containing fluxing salt to provide a fired inorganic or ceramic product wherein said dross is processed to remove fluxing salts therefrom, and wherein a non-metallic product is recovered. The improved process comprises providing a body of the non-metallic product in an aqueous slurry, a major portion of the body comprised of $Al_2O_3$ and minor portions of said body comprised of $SiO_2$ and MgO. The composition of the slurry is adjusted by adding one of $Al_2O_3$ and $SiO_2$ in an amount sufficient to form the fired inorganic product on heating. The slurry is heated to a temperature sufficiently high to fire the slurry and produce the fired inorganic product.

DETAILED DESCRIPTION OF THE PREFERRED EMBODIMENTS

Secondary aluminum dross of the type contemplated by the invention described herein consists of dross recovered from processes in which aluminum scrap has been melted to prepare reusable metal in the form of aluminum ingots, while tertiary aluminum dross consists of dross recovered from furnaces employed in recovering the secondary dross, both materials being sometimes referred to herein as "dross". Such dross is to be distinguished from dross produced in the process of preparing the original metal by electrolytic means. Although useful in any secondary or tertiary dross leaching-type recovery process such as the one described herein, the invention is particularly useful in the recovery of aluminum dross containing large amounts of magnesium chloride, for example, that derived from the reclamation of used beverage cans. In this regard, beverage cans must have stiffened lids if the pull tabs commonly employed for opening them are to be operable. Such stiffness requires the use of high-magnesium content aluminum alloys for their fabrication; consequently, the invention is particularly applicable to dross obtained from recycled beverage cans which contains large amounts of magnesium chloride for the reasons mentioned.

Depending upon its source, and on a weight basis, secondary dross and salt cake will contain 3% to 25% aluminum; 25% to 50% fluxing material, and 25% to 72% aluminum oxide. The fluxing material comprises substantially equal weight amounts of sodium chloride and potassium chloride, since a eutectic mixture is formed in that ratio which melts at about 1384° F., compared to 1474° F. for the sodium salt and 1422° F. for the potassium salt. The use of the eutectic allows minimal super-heating of the aluminum, which melts at about 1220° F. to reduce the flux to its operable molten condition.

The process results in the recovery of the flux salt in substantially the eutectic ratio, a form in which it can be re-used for fluxing purposes, as well as of pure aluminum. Also recovered is a product comprising a high proportion of aluminum metal fines and aluminum oxide, known in the industry as "exotherm", which is useful as an exothermic topping in steel manufacture because of its heat-producing and heat-retention characteristics.

The remaining product of the process is the non-metallic NMP, which is typically disposed of in a landfill operation.

Figure 1:
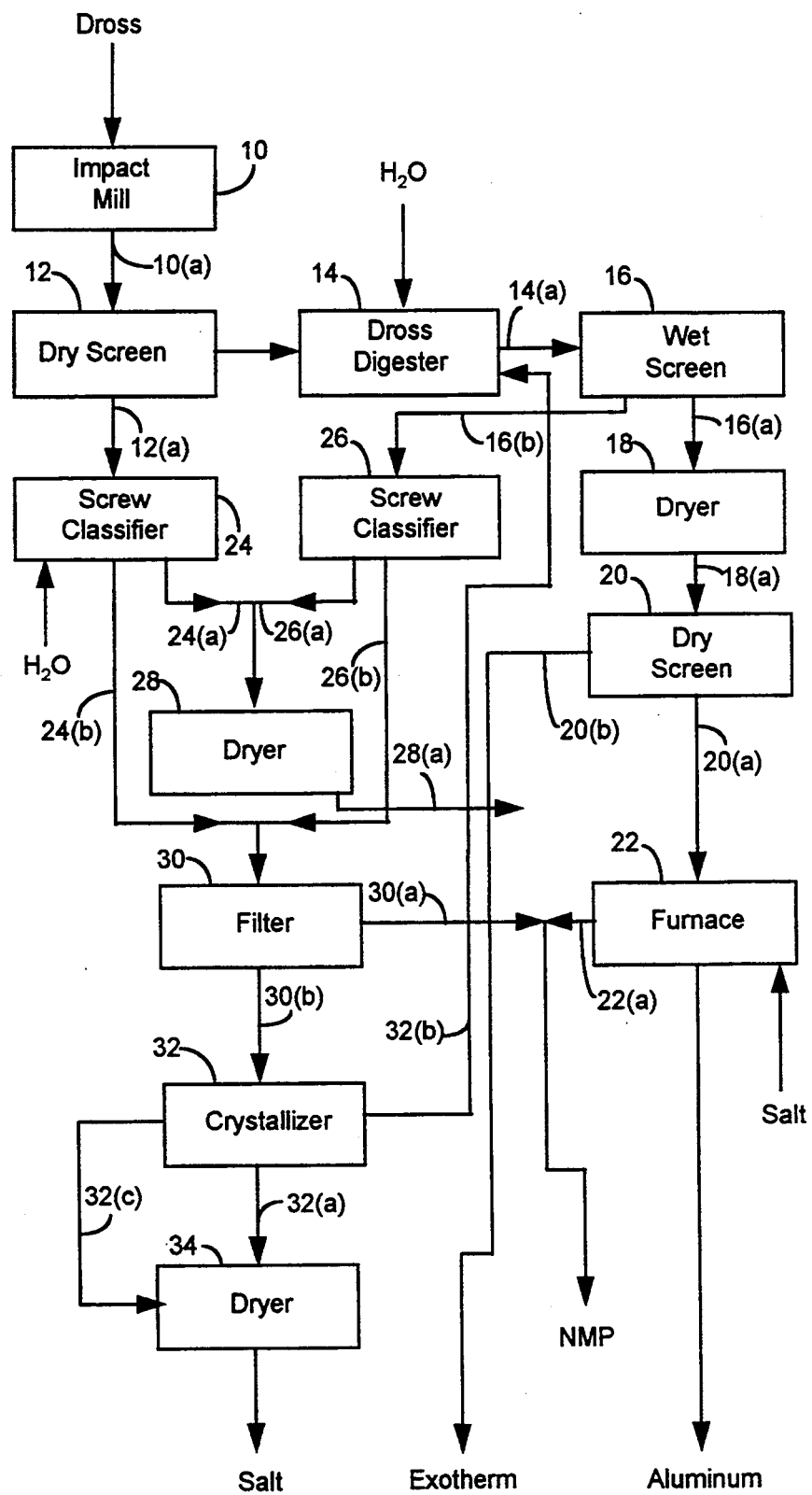
FIG. 1 is a schematic flow diagram of the aluminum dross recovery process showing salt, NMP and aluminum recovery.

Referring now to FIG. 1, the dross is initially processed through a crusher, for example, a ball mill or equivalent device 10, where the received dross is fragmented. The reduced fragments 10(a) are then passed over a screen 12 where size classification of the fragments is carried out. Commonly, at least two fractions are produced, one containing fines, typically below −10 mesh. The other fraction, usually representing up to 80% of the crushed material and known as "middlings", ranges from about −4 to +10 mesh. Pieces larger than four inches can serve as furnace feed without further processing, provided they contain sufficient aluminum content; otherwise, they are recycled to the crusher 10.

Each of the streams, the fines and the middlings, are processed separately in order to maximize recovery of the aluminum content thereof.

The middling stream 12(b) is fed to a dross digester 14 to which water is introduced the digester can be any suitable vessel capable of holding the dross middlings and the water introduced therein for purposes of leaching the dross solubles. However, it has been advantageous to employ agitated mixers of the type normally carried on concrete trucks since they are readily available and relatively inexpensive, besides possessing the necessary physical characteristics to carry out the leaching operation.

In order to suppress the reactions previously referred to so as to minimize the unwanted production of ammonia, methane, hydrogen, hydrogen sulfide and other noxious products, the leaching operation is carried out in digester 14 at a pH below about 8. In addition, and preferably, the pH is controlled above 5 since below that figure, the digester contents are so acidic that severe corrosion of the equipment is produced.

While the magnesium chloride naturally present in the dross would, in the normal course of the digestion, be sufficient to restrain the pH of the digester contents from rising, some of the magnesium chloride is converted to magnesium hydroxide, which being insoluble, is precipitated from solution. Thus, the contents of the digester become more basic, a condition which favors the creation of still more of the hydroxide, reinforcing the tendency of the digester contents to become so basic that the unwanted reactions referred to are promoted, rather than eliminated.

To avoid the overly-basic condition, it has been found that the introduction into the digester of magnesium chloride containing liquor from the evaporator-crystallizer 32, which shall be described in greater detail in the following, can maintain the pH in the range of from about 5 to about 8 without the addition of extraneous magnesium chloride to the system, the disadvantage of which has already been described. In carrying out the pH adjustment, samples of the digester's contents are periodically subjected to pH analysis and evaporator liquor 32(b) is added, as required, to maintain the pH of the digester in the desired range. Digestion times will vary, depending upon the character of the dross being treated; normally however, the digestion will last from about twenty minutes to one hour.

Following solution of the solubles in the digester 14, its contents 14(a) are fed as a slurry to a wet screening operation with a wet screen 16 which divides the digested materials into one fraction containing coarse particles, for instance, +20 mesh, and a stream of fine particles of about −20 mesh. The coarse particles 16a, which contain a relatively high metallic aluminum content and some aluminum oxide are sent to a dryer 18, which may be a rotary drum dryer, where the material is dried. The dried material 18(a) is then passed to a dry screen 20 where the material is divided into a coarse fraction of about +8 mesh, and a fines fraction approximately −8 mesh. The coarse fraction 20(a) is passed to a furnace 22, where the material is covered with a layer of flux salt, which acts as an insulating layer, and heated to a temperature sufficient to melt the free aluminum present, the metal then being tapped from the furnace and cast into aluminum ingots. The balance of the material 22(a) constitutes non-metallic product which is removed from the furnace and may be disposed of in a landfill.

Referring again to the wet screening operation at wet screen 16, the fines there obtained are removed as a slurry 16(b), rather than being furnaced, so that any aluminum present in the fines does not combine with oxygen in the furnace to produce unwanted aluminum oxide.

The slurry 16(b) is sent to a screw classifier 26, solids 26(a) from the classifier then being fed to a dryer 28, for example, of the rotary drum type, where they are dried and forwarded as exotherm product 28(a) to storage.

Again referring to dry screen 12, the fines 12(a) therefrom are fed to a screw classifier 24 and combined with water therein, the classifier in effect functioning as an additional digester. It is unnecessary to control the pH in the classifier 24 since the solids entering the classifier contain minimal aluminum, and therefore, the unwanted side reactions referred to are not a serious problem. The amount of water introduced into classifier 24 is deliberately maintained at a minimum, as is the water added to dross digester 14, in order to reduce the amount of water that must ultimately be removed in the crystallization operation described in the following. The solids 24(a) discharged from classifier 24 are also fed to dryer 28 and the resulting exotherm product sent to storage.

The liquids 24(b) and 26(b) leaving the classifier 24 and 26, respectively, are processed in a filter 30, which may be a rotary drum filter employing diatomaceous earth as a filter aid, or it may be some other type of filter such as a filter press, or an equivalent of the preceding. The solid cake obtained from the filter 30(a) after being discharged therefrom is sent to a landfill as non-metallic product. Suppression of the unwanted reactions referred to in connection with the dross digester 14 has a further beneficial affect in that it permits filter 30 to operate at lower temperatures, and thus more satisfactorily than would otherwise be the case. The liquid 30(b) from the filter is introduced into a crystallizer 32 where the water is evaporated and the flux salts crystallized.

A portion of the liquor in the crystallizer 32 is transferred as a side stream 32b, normally containing about 8 wt. % to 9 wt. % of magnesium chloride back to the dross digester 14 to act as a pH control, as previously described. The crystallizer may be any one of the many types available in the market; however, it has been found that a forced circulation evaporator with mechanical vapor recompression provides beneficial operating advantages in the process, and its use is preferred.

The crystallizer normally operates at a temperature of about 235° F. to 236° F., a temperature at which the flux salt gradually precipitates from solution. Were it not removed, however, the continual addition of the magnesium chloride contained in the brine fed to the crystallizer would raise the boiling point of the liquor and result in the temperature of the crystallizer rising, for example to about 243° F., a point at which the magnesium chloride would then also precipitate from solution. Such a temperature, however, would result in problems being experienced with the crystallization operation, among other things, due to the fact that the high temperature would cause shutdown of the compressor used in conjunction with the crystallization system. This difficulty is overcome, however, not only by removal of the magnesium chloride stream 32(b) recycled to the dross digester 14, but also by a further side stream 32(c) removed from the crystallizer. Preferably in this regard, the magnesium chloride present in the crystallizer is controlled by withdrawal of such streams in amounts such that the magnesium chloride present in the crystallizer does not exceed about 3 wt. % to 7 wt. %, a concentration at which the temperature of the crystallizer can be maintained at about 235° F. to 236° F. The fluxing salts 32(a) recovered from the crystallizer 32 are sent to a dryer 34 wherein the salts are dried and forwarded to storage. The stream 32(c) from the crystallizer also discharges into the dryer, the magnesium chloride thereby being removed from the system, or it can otherwise be disposed of.

In summary, and while the numbers will vary depending upon the nature of the dross being processed, NMP produced by the process of the invention can be as low as 39% of the total dross processed, compared to significantly greater percentages produced in other prior art processes. This is reflected in the fact that whereas the process of the invention employs only about 20 pounds of flux per 100 pounds of aluminum recovered, some prior art processes consume as much as 110 pounds of flux per 100 pounds of aluminum.

The amount of NHP produced from dross or skim can range from 25 wt. % to 75 wt. % of the total dross processed, depending to some extent on the nature of the dross being processed. Thus, while other processes were selected carefully to minimize the amount of NMP, any process may be used to treat the dross because all the end products resulting from the process can be used. Further, the present invention permits the use of any aluminum dross.

For purposes of the present invention, it is preferred that the NMP comprises about 40 wt. % to 75 wt. % $Al_2O_3$, 5 wt. % to 20 wt. % MgO, and 2 to 15 wt. % $SiO_2$, the remainder may be comprised of oxides of Ti, Cu, Zn, K, S, Ca and Na and other trace elements. Preferably, the NMP comprises about 40 wt. % to 70 wt. % $Al_2O_3$, 7 wt. % to 18 wt. % MgO, and 3 to 12 wt. % $SiO_2$ with a typical amount being about 54 wt. % $Al_2O_3$, 11 wt. % MgO, 4 wt. % $SiO_2$, 5.6 wt. % CaO, 3 wt. % $TiO_2$, and about 2 wt. % $Fe_2O_3$. In addition, the NMP can contain about 0.3 wt. % S, about 5 wt. % C, about 2 wt. % Cl and have an LOI of about 20 wt. %.

The NMP recovered from the dross treatment is usually in the form of filter cake and can contain up to about 30 wt % $H_2O$. If dried the NMP would have a particle size that would pass through a 20 mesh, Standard Sieve. Thus, normally, the NMP can be used in the condition as removed from the dross treatment.

Figure 2:
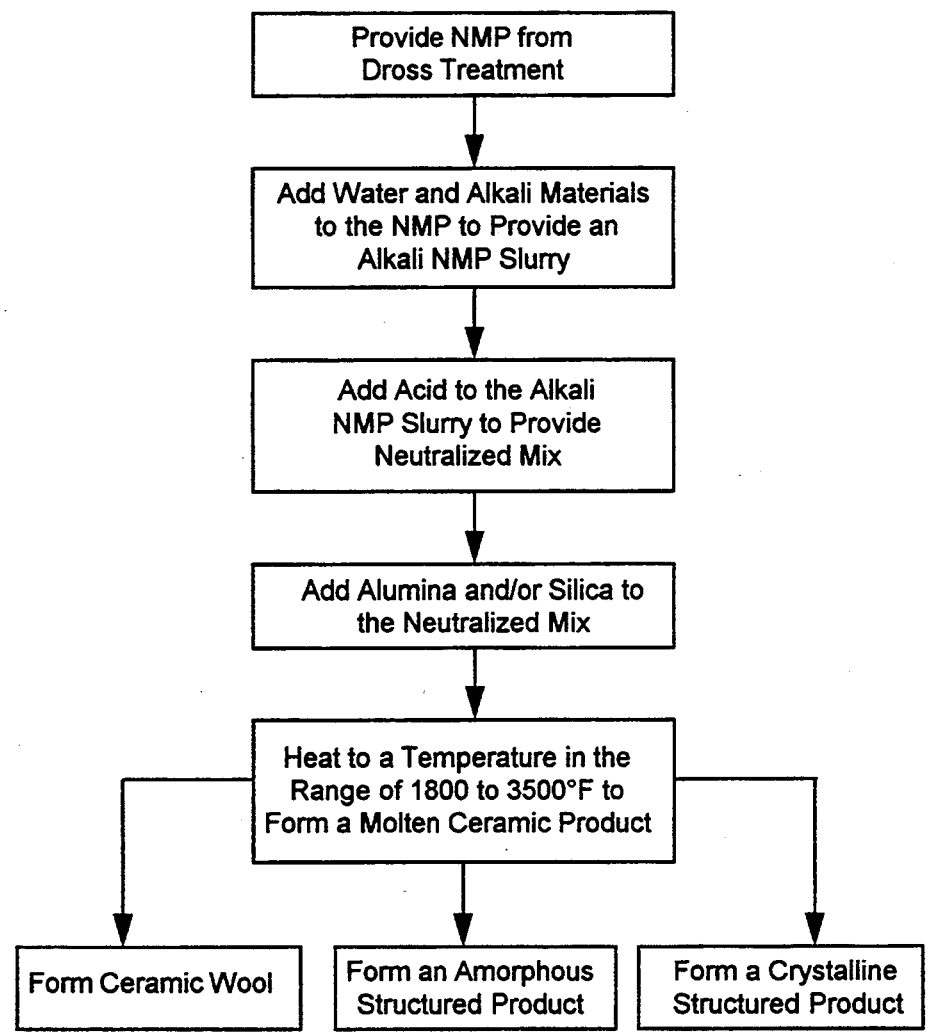
FIG. 2 is a schematic flow chart showing steps in processing the NMP into a useful product.

For purposes of the present invention, the NMP recovered from the dross is put through a series of reactions for purposes of enabling the inorganic constituent contained therein to bind or bond in a ceramic matrix (See FIG. 2). Thus, to the NMP which is normally in particle or cake form is added water to provide an aqueous base or suspension. To the suspension of NMP and water is added alkali material for purposes of oxidizing or converting metals contained in the NMP. Further, the alkali material serves as a flux during the subsequent vitrification step. Different alkali material may be used including sodium hydroxide, calcium hydroxide, borax, and soda ash. Any one of these alkali materials may be used. However, it is preferred that a combination comprised of calcium hydroxide, sodium hydroxide, sodium borate, and sodium carbonate is used. Typically, the preferred combination of alkali material is comprised of 30 to 45 wt. % $Ca(OH)_2$, 3 to 10 wt. % NaOH, 8 to 15 wt. % $Na_2B_4O_7$, the remainder, sodium carbonate. Typically, the combination of preferred alkali materials is added in the range of 3 to 10 wt. % per pound of NMP. The time of treatment of NMP with alkali material is 20 to 120 minutes and typically 60 to 120 minutes.

After the alkali treatment, it is desirable to substantially neutralize the alkali present in the NMP. Thus, acidic material is added for purposes of neutralizing the alkali remaining in the NMP slurry. Any industrial acid is suitable and such acids may be selected from hydrochloric acid, sulfuric acid, nitric acid and acetic acid or combinations thereof with the preferred acid being hydrochloric acid. The amount of acid added is that sufficient to provide a pH in the NMP slurry in the range of about 6.5 to 7.7 and preferably about 7 to 7.5. The acid can also aid in dissolving constituents in the NMP that are not converted to oxide, for example. The time of treatment with acid can extend from 10 to 120 minutes and typically 60 to 120 minutes.

In order to form a fired inorganic product or ceramic product in accordance with the invention, it is necessary to provide a matrix or framework for the formation of the ceramic product. This can be referred to as the addition of matrix formers. Typically, such matrix formers are selected from silica and/or alumina. Thus, depending on the properties desired in the ceramic product, either silica or alumina or both are added in controlled amounts to the neutralized NMP material. It will be appreciated that the alumina and/or silica present provide a matrix for the ceramic product, and other inorganic constituent present in the NMP will bond in and become part of the matrix. Such inorganic constituent can include any alkali materials or metals present in the NMP. Thus, the ceramic product effectively uses all the components of the NMP.

It should be noted that the NMP is comprised predominantly of alumina, with lesser amounts of magnesia and silica. Thus, silica and alumina are added in specific amounts depending on the properties desired in the ceramic product. Thus, there is a balance that should be obtained among the constituents in order to achieve the properties of the fired inorganic product or ceramic product. It will be appreciated that the amount of constituents, e.g., alumina, magnesia and silica constituting the NMP can vary depending on the process used for treating the dross and the feedstock used. Accordingly, analysis of the NMP should be made in order to determine how much of each matrix former should be added. In addition to the analysis of NMP, additions of matrix formers are made depending on the properties desired in the ceramic product. For example, if it is desired to produce a very hard abrasive, then the amount of alumina is maintained in a predominant level. However, if it is desired to make a softer abrasive material, then the level of alumina is decreased and the level of silica increased. Silica may be added in the form of silica sand or clay or such similar material. It is preferred that the form of silica added is in quartz form. Any form of alumina, other than fused alumina, can be used.

When the neutralized NMP and matrix former are blended for a time sufficient to ensure a homogeneous blend, it is subjected to heating for purposes of bonding and forming a fired inorganic product or a ceramic product. The fired inorganic product is any product that bonds the materials together on heating and may include a ceramic product. Thus, the homogeneous blend is heated to a temperature range of 1800° to 3500° F. Normally, bonding occurs at about 1800° to 2300° F.; however, the higher temperature permits the ceramic material to reach a molten condition. It will be appreciated that the higher the alumina content, the higher the temperature required to reach a molten condition and the flowability of the molten product.

If it is desired to form a fibrous product from the molten ceramic, an air stream is applied to a stream of the molten ceramic as it is poured from the furnace. The air flow should have sufficient force to cause the molten stream flowing from the furnace to form into fibers. The fibers can be used for insulation blankets in high temperature furnaces or for vacuum formed ceramics.

If it is desired to form a non-crystalline or amorphous structure for use as an abrasive, the molten ceramic can be poured into a water bath. To obtain an amorphous structured abrasive, the water quenched product is exposed to a heat source and annealed. Annealing can be performed in a temperature range of 1100° to 1500° F. for a period of at least 15 minutes and typically greater than 2 hours. Longer annealing times do not normally adversely affect the abrasive.

Thereafter, the annealed product is crushed into small particles suitable for use as an abrasive. Typical sizing will be between 20 mesh and 40 mesh Standard Sieve Size or −40 for such items as buffing compounds. Hardness values can range from 700 to 1300 on the Vicker's Scale, with 850 to 900 being typical.

In an alternative method, the molten ceramic can be poured into molds and cooled slowly to form a crystalline structure. The crystalline structure is very hard and when crushed into small particles makes excellent abrasives.

The addition of components to the NMP is illustrated by the following ranges based on 1000 lbs. of NMP. For 1000 lbs. of NMP containing about 100 lbs. of water, to provide a slurry, water is added in the range of 250 to 600 lbs. Alkali, e.g. 3 lb. sodium hydroxide, 20 lb. sodium carbonate, 20 lb. calcium hydroxide, 6 lb. borax, is added to the slurry in the range of about 35 to 120 lbs. As noted earlier, the alkali oxidizes metallic constituents and provides flux for subsequent vitrification. For purposes of neutralization of the alkali treated slurry, acid such as hydrochloric acid is added in the range of about 40 to 150 lbs. After neutralization, silica and/or alumina are added usually in the range of about 200 to 650 lbs, depending on the silica and alumina content of the NMP and the use of the end product. That is, the amount of silica and or alumina added depends on the properties desired in the end product.

For purposes of producing a product such as a grinding wheel containing the abrasive particles, any bonding material can be used that encapsulates and holds the abrasive particles. Further, the bonding material can be selected depending on the end use of the abrasive product. Thus, the bonding can be selected from organic binders or inorganic binders.

The organic binders can be a resinous binder that may be mixed with a variety of additions or modifiers to aid in binding the abrasive material in the shape of a grinding wheel, etc. Preferably, the organic binder is an organic binder such as a thermosetting phenolic resin that may be selected from phenoxy, phenol-furfural, anitine-formaldehyde, urea-formaldehyde, epoxy, cresol-aldehyde, urethane, polyester, polyimides, resorcinol-aldehydes, urea-aldehyde, melamine-formaldehyde and mixtures thereof. Further, additives may be provided in the bond material for improving strength, cost reduction and for improving grinding performance.

Any inorganic glassy or vitreous bond material may be used to hold the abrasive material. Thus, preferably the present invention may comprise a vitreous-bonded mixed abrasive grinding article. The vitreous bond may include therein beneficial fillers such as kyanite, mullite, alumina and the like. Also, conventional grinding aids may be used. In addition to grinding aids, fillers, etc., the abrasive articles may include any secondary abrasives that aid the grinding operation.

Abrasive bodies made using the NMP based abrasive recovered from dross are suitable for all types of grinding operations including grinding all types of metals such as various steel, and metals such as chromium, titanium and aluminum.

The following examples are still further illustrative of the invention.

EXAMPLE 1

For purposes of preparing fibrous material suitable for high temperature insulation, the components were added and treated in accordance with the following procedure. To 1000 lbs of NMP containing about 100 lbs. of water was added 350 lbs of water. The NMP and water were mixed thoroughly to form a slurry. To the slurry was added 3 lbs of sodium hydroxide, 20 lbs of sodium carbonate, 20 lbs calcium hydroxide and 6 lbs of borax. The slurry and alkali material were mixed for a period of 20 minutes. Then, 60 lbs of hydrochloric acid was added to the alkali-slurry mixture to neutralize it. Thereafter, 400 lbs of silica sand was added and thoroughly mixed with the neutralized mixture. The neutralized mixture was then heated to a temperature of 3100° F. at which point the mixture had reached a glassy, molten condition and had formed a ceramic material. In order to form a fibrous product, the molten ceramic material was poured from the furnace and contacted with an air flow sufficiently strong to enable the molten ceramic material to form into fibers.

EXAMPLE 2

For purposes of preparing an abrasive material, to 1000 lbs of NMP containing about 100 lbs of water was added 350 lbs of water to make a slurry. To the slurry was added 6 lbs of sodium hydroxide, 35 lbs of sodium carbonate, 40 lbs of calcium carbonate and 12 lbs of borax. The alkali was mixed thoroughly with slurry for about 20 minutes. Thereafter, 120 lbs of hydrochloric acid was added to neutralize the alkali-slurry mixture. Then, 350 lbs of silica sand was added to the neutralized mixture and thoroughly mixed therewith. This mixture was then heated to a temperature of 2900° F. to form a molten ceramic material. The molten ceramic material was then poured slowly into a water bath to form a non-crystalline ceramic that was annealed by heating for 120 minutes at 1500° F. The annealed product was then ground into particles having a size between 20 and 40 mesh Standard Sieve. The particles were found to have a 900 hardness (Vickers Scale).

Thus, it will be seen from the above that NMP from aluminum dross can be successfully incorporated into a useful ceramic product. All the components of aluminum dross can be successfully recycled without need for dumping in landfills, thereby avoiding the problems attendant thereto.

While the invention has been described in terms of preferred embodiments, the claims appended hereto are intended to encompass other embodiments which fall within the spirit of the invention.

What is claimed is:

1. An improved method for processing aluminum dross containing fluxing salt to provide a fired inorganic product having a $SiO_2$ and/or $Al_2O_3$ matrix wherein said dross is processed to remove fluxing salts therefrom, and wherein a non-metallic product comprising 25–75 wt % $Al_2O_3$, 1–20 wt % MgO and the balance $SiO_2$ is recovered, the improvement comprising:
   (a) adding water to a body of said non-metallic product to provide an aqueous slurry;
   (b) adjusting the composition of said slurry by adding one of $Al_2O_3$ and $SiO_2$ in an amount sufficient to form said fired inorganic product on heating; and
   (c) heating said slurry to a temperature sufficiently high to fire said slurry and produce said fired inorganic product.

2. The method in accordance with claim 1 wherein said non-metallic product is comprised of 40 to 75 wt % $Al_2O_3$.

3. The method in accordance with claim 1 wherein said non-metallic product is comprised of at least 1 wt % $SiO_2$.

4. The method in accordance with claim 1 wherein said non-metallic product is comprised of 40 to 75 wt % $Al_2O_3$, 5 to 20 wt % MgO, and 2 to 15 wt % $SiO_2$.

5. The method in accordance with claim 1 including the step of treating the non-metallic product in said slurry with an alkali material.

6. The method is accordance with claim 5 including the step of adding an acid to said alkali treated non-metallic product to provide a neutral pH.

7. The method in accordance with claim 5 wherein said alkali material is selected from at least one of sodium hydroxide, calcium hydroxide, sodium borate and sodium carbonate.

8. The method in accordance with claim 5 wherein the alkali material is comprised of 30 to 45 wt. % Ca(OH), 3 to 10 wt. % NaOH, 8 to 15 wt. % $Na_2B_4O_7$, the remainder sodium carbonate.

9. The method in accordance with claim 1 wherein the fired inorganic product is a ceramic product.

10. The method in accordance with claim 1 wherein said heating is to a temperature range of 1500° to 3500° F.

11. The method in accordance with claim 1 wherein said heating is to a temperature range of 1800° to 3500° F.

12. An improved method for processing aluminum dross containing fluxing salt to provide a ceramic product having a $SiO_2$ and/or $Al_2O_3$ matrix wherein said dross is processed to remove fluxing salts therefrom, and wherein a non-metallic product comprising 25–75 wt % $Al_2O_3$, 1–20 wt % MgO and the balance $SiO_2$ is recovered, the improvement comprising:
   (a) adding water to a body of said non-metallic product to provide an aqueous slurry;
   (b) adjusting the composition of said slurry by adding one of $Al_2O_3$ and $SiO_2$ in an amount sufficient to form said ceramic product on heating; and
   (c) heating said slurry to a temperature sufficiently high to produce a molten ceramic product.

13. The method in accordance with claim 12 wherein said non-metallic product is comprised of 40 to 75 wt % $Al_2O_3$, 5 to 20 wt % MgO, and 2 to 15 wt % $SiO_2$.

14. The method in accordance with claim 12 including the step of treating the non-metallic product with an alkali material.

15. The method in accordance with claim 14 including the step of adding an acid to said alkali treated non-metallic product to provide a neutral pH.

16. The method in accordance with claim 14 wherein said alkali material is selected from at least one of sodium hydroxide, calcium hydroxide, sodium borate and sodium carbonate.

17. The method in accordance with claim 12 including the additional step of forming said molten ceramic product into fibers.

18. The method in accordance with claim 12 including the additional step of pouring said molten ceramic product into water to form a ceramic product having a non-crystalline structure.

19. The method in accordance with claim 12 including the additional steps of pouring said molten ceramic product into a mold and cooling at a rate sufficiently slow to form a crystalline product.

20. An improved method for processing aluminum dross to provide an abrasive particles having a $SiO_2$ and/or $Al_2O_3$ matrix wherein said dross is processed to remove aluminum values therefrom, and wherein a non-metallic product comprising 25–75 wt % $Al_2O_3$, 1–20 wt % MgO and the balance $SiO_2$ is recovered, the improvement comprising:
   (a) adding water to a body of said non-metallic product to provide an aqueous slurry;
   (b) adjusting the composition of said slurry by adding one of $Al_2O_3$ and $SiO_2$ in an amount sufficient to form a ceramic product;
   (c) heating said slurry to a temperature sufficiently high to produce a molten ceramic product;
   (d) pouring said molten ceramic product into water to form an non-crystalline product;
   (e) annealing said non-crystalline product; and
   (f) crushing said annealed product into abrasive particles.

21. An improved method for processing aluminum dross to form abrasive particles having a $SiO_2$ and or $Al_2O_3$ matrix wherein said dross is processed to remove aluminum values therefrom, and wherein a non-metallic product comprising 25–75 wt % $Al_2O_3$, 1–20 wt % MgO and the balance $SiO_2$ is recovered, the improvement comprising:

(a) adding water to a body of said non-metallic product to provide an aqueous slurry;
(b) adjusting the composition of said slurry by adding one of $Al_2O_3$ and $SiO_2$ in an amount sufficient to form a ceramic product on heating;
(c) heating said slurry to a temperature sufficiently high to produce a molten ceramic product;
(d) solidifying said molten ceramic product at a rate sufficiently slow to form a crystalline ceramic product; and
(e) crushing said crystalline ceramic product to form said abrasive particles.

22. An improved method for processing aluminum dross to form a ceramic fiber product having a $SiO_2$ and or $Al_2O_3$ matrix wherein said dross is processed to remove aluminum values therefrom, and wherein a non-metallic product comprising 25–75 wt % $Al_2O_3$, 1–20 wt % MgO and the balance $SiO_2$ is recovered, the improvement comprising:
(a) adding water to a body of said non-metallic product to provide an aqueous slurry;
(b) adjusting the composition of said slurry by adding one of $Al_2O_3$ and $SiO_2$ in an amount sufficient to form a ceramic product on heating; and
(c) heating said slurry to a temperature sufficiently high to produce a molten ceramic product;
(d) pouring said molten ceramic product; and
(e) contacting said molten ceramic product during pouring with and air stream to form a fiber ceramic product.

23. The method in accordance with claim 20 wherein said non-metallic product contains 25 wt. % to 75 wt. % $Al_2O_3$, 5 wt. % to 20 wt. % MgO, the balance $SiO_2$.

24. The method in accordance with claim 21 wherein said non-metallic product contains 25 wt. % to 75 wt. % $Al_2O_3$, 5 wt. % to 20 wt. % MgO, the balance $SiO_2$.

25. The method in accordance with claim 22 wherein said non-metallic product contains 25 wt. % to 75 wt. % $Al_2O_3$, 5 wt. % to 20 wt. % MgO, the balance $SiO_2$.

* * * * *